United States Patent [19]

Ishimori et al.

[11] Patent Number: 4,696,365
[45] Date of Patent: Sep. 29, 1987

[54] FOUR WHEEL DRIVE VEHICLE

[75] Inventors: Shozo Ishimori, Sakai; Mikio Ishida, Osaka; Hiroyuki Miki, Sakai; Seiichi Ishiizumi, Sakai; Kazuo Hirata, Sakai, all of Japan

[73] Assignee: Kubota, Ltd., Osaka, Japan

[21] Appl. No.: 925,066

[22] Filed: Oct. 30, 1986

[30] Foreign Application Priority Data

May 2, 1986 [JP] Japan ................................ 61-102716
Sep. 1, 1986 [JP] Japan ................................ 61-205445
Sep. 2, 1986 [JP] Japan ........................... 61-135208[U]

[51] Int. Cl.⁴ ............................................. B60K 17/34
[52] U.S. Cl. .................................... 180/233; 180/75.1
[58] Field of Search ............... 180/233, 240, 244, 245, 180/246, 247, 248, 249, 250, 75.1

[56] References Cited

U.S. PATENT DOCUMENTS

| | | | |
|---|---|---|---|
| 3,763,947 | 10/1973 | Longshore | 180/247 |
| 4,420,059 | 12/1983 | Suzuki | 180/249 |
| 4,484,653 | 11/1984 | Horikoshi et al. | 180/233 |
| 4,508,190 | 4/1985 | Uchiyama | 180/75.1 |
| 4,574,910 | 3/1986 | Miki et al. | 180/249 |
| 4,591,177 | 5/1986 | Perlini | 280/91 |
| 4,605,087 | 8/1986 | Ashauer et al. | 180/248 |

FOREIGN PATENT DOCUMENTS

| | | | |
|---|---|---|---|
| 189176 | 7/1986 | European Pat. Off. | 180/233 |
| 63524 | 4/1983 | Japan | 180/248 |
| 63525 | 4/1983 | Japan | 180/248 |
| 136521 | 8/1983 | Japan | 180/248 |

Primary Examiner—John A. Pekar
Attorney, Agent, or Firm—Cushman, Darby & Cushman

[57] ABSTRACT

A four wheel drive vehicle with dirigible front wheels, comprising a main propelling drive transmission, and a front wheel drive transmission connected to the main transmission. The front wheel drive transmission is switchable between a first four wheel drive mode in which the front wheels and the rear wheels are driven at a substantially equal peripheral speed and a second four wheel drive mode in which the front wheels are driven at a higher peripheral speed than the rear wheels. The front wheel drive transmission includes a piston operable by a hydraulic control system including a control valve mechanically interlocked to a steering section of the vehicle for switching the front wheel drive transmission from the first drive mode to the second drive mode. The piston, which normally is biased toward a position for the first drive mode, is movable against the biasing force to a position for the second drive mode when the front wheels are steered to an angle exceeding a predetermined angle.

7 Claims, 9 Drawing Figures

FOUR WHEEL DRIVE VEHICLE

BACKGROUND OF THE INVENTION

1. Field of the Invention

The present invention relates to a four wheel drive vehicle, particularly an agricultural tractor, comprising a front wheel drive transmission including a first clutch engageable to establish a first four wheel drive mode in which an average peripheral speed of right and left front wheels is equal or approximately equal to an average peripheral speed of right and left rear wheels, and a second, multidisk clutch engageable to establish a second four wheel drive mode in which the average peripheral speed of the right and left front wheels is higher than the average peripheral speed of the right and left rear wheels.

2. Description of the Prior Art

A four wheel drive tractor as described above is known, for example from U.S. Pat. No. 4,574,910. In order to effect a smooth front wheel change speed operation and to simplify an interlocking structure in the case of automatic change speed, the tractor disclosed in this U.S. patent comprises a front wheel drive transmission including a first and a second clutches which are driven by two hydraulically operable pistons, respectively. Generally, where the clutches are driven by means of oil pressure, power for driving a hydraulic pump to supply the pressure oil to these pistons is taken out at a position downstream of a main clutch operable to establish and break transmission of engine power to a transmission case.

Therefore, when the tractor is stopped by applying brakes to the rear wheels and the main clutch is disengaged to avoid engine stopping, the hydraulic pump stops operating and the front wheel drive transmission assumes neutral whereupon the rear and front wheels are brought out of operative connection which frees the front wheels from the braking action to the detriment of braking effect. When the hydraulic system fails to function properly, the front wheel drive transmission assumes neutral and four wheel drive becomes impossible. Further, pressure oil must be supplied constantly to maintain clutch engagement, which tends to raise oil temperature.

This type of agricultural tractor makes a small sharp turn by accelerating the front wheels, and for this purpose the front wheel drive transmission is switched to the second four wheel drive mode in response to movements of control devices of the tractor such as a steering wheel, a side brake pedal and a change speed lever.

Generally, in a model having one of the control devices, for example the steering wheel, and the front wheel drive transmission interlocked to one another, an electromagnetic control valve is provided to supply and exhaust pressure oil to/from the hydraulic valve in the accelerating drive system and a limit switch or the like is provided to electrically detect an operation of the steering wheel exceeding a predetermined angle and to produce an electric signal for operating the electromagnetic control valve.

The operation of the steering wheel exceeding the predetermined angle is easily detected on the basis of movement of the pitman arm disposed below the tractor chassis. However, this tends to deteriorate the reliability and durability of the limit switch and other electric elements in the case of a working vehicle used to travel on an unleveled ground or a paddy field since the electric elements are subjected to mud and water. It is therefore necessary to provide sufficient shielding to assure their reliability and durability, and this results in increased manufacturing cost.

The clutches of the front wheel drive transmission may be directly and operatively connected to the control device of the tractor through mechanical interlocking means without using hydraulic means at all. However, such a construction inevitably has weakness in operability.

SUMMARY OF THE INVENTION

The object of the present invention is to eliminate the drawback of the prior art noted above and to provide a four wheel drive vehicle including a front wheel drive transmission having excellent operability, reliability and durability.

In order to achieve this object, a four wheel drive according to the invention comprises an engine, a transmission case housing a main propelling drive transmission, front wheels and rear wheels driven by the engine, the front wheels being dirigible, front wheel drive transmission means connected to the main transmission for effecting changeover between a first four wheel drive mode in which the front wheels and the rear wheels are driven at a substantially equal peripheral speed and a second four wheel drive mode in which the front wheels are driven at a higher peripheral speed than the rear wheels, the front wheel drive transmission means including a first transmission mechanism for effecting the first four wheel drive mode, a second transmission mechanism for effecting the second four wheel drive mode, and clutching means, the clutching means having a first clutch for operatively connecting the first transmission mechanism to the front wheels, a second clutch for operatively connecting the second transmission mechanism to the front wheels, a hydraulically operable piston movable between a position to disengage the first clutch and engage the second clutch and a position to engage the first clutch and disengage the second clutch, and a spring for biasing the piston toward the position to engage the first clutch and disengage the second clutch, and hydraulic control means including a control valve mechanically interlocked to a steering section of the vehicle for actuating the piston.

In the above construction, when pressure oil is supplied to the clutching means of the front wheel drive transmission, the piston moves to the position to disengage the first clutch and engage the second clutch whereby the front wheel drive transmission assumes the second four wheel drive mode. When the pressure oil supply is stopped, the spring causes the piston to move to the position to engage the first clutch and disengage the second clutch whereby the front wheel drive transmission assumes the first four wheel drive mode.

By utilizing the hydraulically operable piston to effect the change speed, the change speed is effected smoothly and the interlocking for effecting controls at times of automatic change speed has a simple construction. Since the front wheel drive transmission assumes the first four wheel drive mode when the pressure oil supply is stopped, rear wheel braking may be applied also to the front wheels, which assures speedy stopping of the vehicle with a high degree of safety. Even when the hydraulic system fails to function properly, the front wheel drive transmission assumes the first drive mode which allows the four wheel drive for advantageous operations. Furthermore, the facts that the pressure oil is not supplied when the front wheel change drive transmission assumes the first drive mode and that the front wheel drive transmission is placed in the second drive mode with low frequency result in effective checking of oil temperature rise at times of four wheel drive and prolonged life of the pressure oil.

Compared with the electric interlocking, the mechanical interlocking structure between the control device of the vehicle and the front wheel drive transmission is readily constructed to be sufficiently capable of withstanding adverse effects of mud and water during vehicle running and to sufficiently assure the reliablity of interlocking function without providing a special shielding treatment.

According to one preferred embodiment of the invention, the speed ratio between the front and rear wheels in the second four wheel drive mode in which an average peripheral speed of the right and left front wheels is higher than an average peripheral speed of the right and left rear wheels, is set such that the rear wheels are dragged by the front wheels also when the front wheels are steered to a maximum steering angle. That is to say, taking into account lengths of loci described by the front wheels and the rear wheels when the vehicle is turned, the peripheral speed of the front wheels is set such that the front wheels are driven at a higher peripheral speed than a speed for permitting the front wheels to run along longer loci than the rear wheels.

A specific speed ratio of the front wheels with respect to the rear wheels after a correction to be described later, should preferably be about 2.0 to 2.5 assuming the maximum front wheel steering angle to be 55 to 60 degrees. This will be explained with reference to FIG. 9 of the accomapnying drawings. In the illustrated example, the vehicle having a wheel base and a tread k is turned with a radius r.

Figure 9:
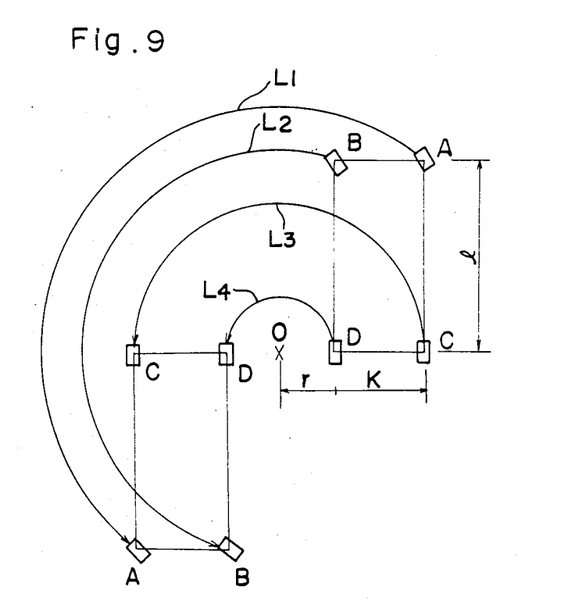
FIG. 9 is a schematic view showing loci described by front and rear wheels when the vehicle makes a turn.

Assuming a turning angle, a locus L1 of an outer front wheel A, a locus L2 of an inner front wheel B, a locus L3 of an outer rear wheel C, and a locus L4 of an inner rear wheel D, the sum L1+L2 of running distances of the front wheels A and B is derived theoretically from the equation $$L1 + L2 = 2\pi \sqrt{l^2 + (K+r)^2} \times \frac{\theta}{360°} + 2\pi \sqrt{l^2 + r^2} \times \frac{\theta}{360°}$$

and the sum L3+L4 of running distances of the rear wheels C and D is derived from the equation $$L3 + L4 = 2\pi(k + r) \times \frac{\theta}{360°} + 2\pi r \times \frac{\theta}{360°}$$

The locus ratio $i_1$ therebetween is derived from the equation $$i_1 = \frac{L1 + L2}{L3 + L4} = \frac{\sqrt{l^2 + r^2} + \sqrt{l^2 + (K+r)^2}}{2r + K}$$

If this locus ratio is multiplied by a correction coefficient $m_1$ reflecting a difference between a rolling direction and a facing direction of the inner front wheel at the time of vehicle turning and by a correction coefficient $m_2$ reflecting differences in radius and actual tire width between the front and rear wheels, the locus ratio $i_2$ after the correction is derived from the equation $$i_2 = i_1 \times m_1 \times m_2$$

Thus, the peripheral speed ratio I between the front and rear wheels for causing the front wheels to drag the rear wheels as described earlier, is formulated as $$I > i_1 \times m_1 \times m_2$$

If, for example, the ratio between the wheelbase and the tread is 2:1, the maximum front wheel steering angle is 55 degrees, $m_1 \approx 1.01$ and $m_2 \approx 1.4$, then $I \approx 1.9$. Therefore, where the peripheral speed ratio I of the front wheels with respect to the rear wheels is set to at least 2.0, the front wheels will drag the rear wheels when the vehicle makes a turn, whereby the right and left rear wheels slip or skid inwardly from normal turning loci to reduce the turning radius of the vehicle.

Other objects and advantages of the present invention will be apparent from the following description.

DESCRIPTION OF THE PREFERRED EMBODIMENT

The invention as embodied in a four wheel drive agricultural tractor which is an example of working vehicle will be described hereinafter with reference to the drawings.

Figure 1:
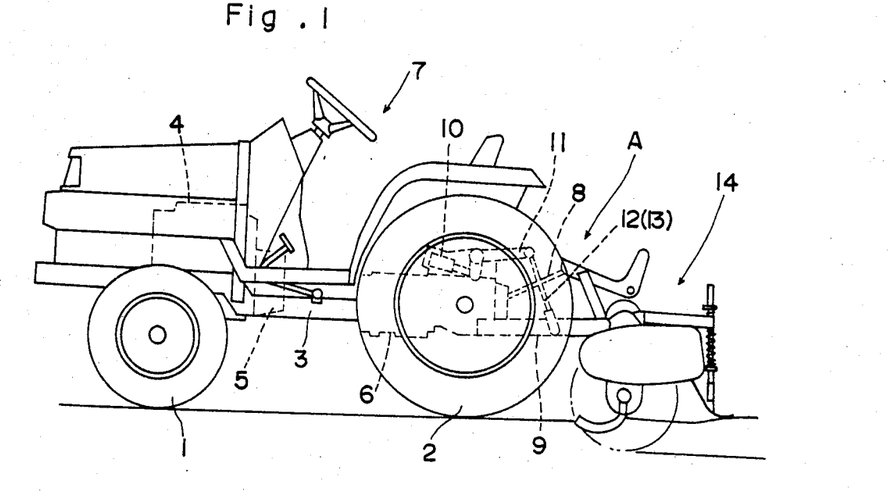
FIG. 1 is a side elevation of a four wheel drive tracdor embodying the invention.

As shown in FIG. 1, this four wheel drive agricultural tractor comprises right and left dirigible front drive wheels 1 and right and left nondirigible rear drive wheels 2 supported by a chassis 3 carrying an engine 4, a main clutch 5, a transmission case 6 and a driver's section 7. The tractor further comprises at a rear end thereof a three-point link mechanism A to which a rotary plow 14 or other working implement is connected and which is vertically oscillatable by a hydraulic cylinder 10, and a power takeoff shaft for transmitting power to the working implement. The three-point link mechanism includes a top link 8, and a pair of right and left lower links 9. One of the lower links 9 is connected to one of lift arms 11 attached to the chassis and the other lower link 9 is connected to the other lift arm 11, respectively, by double acting hydraulic cylinders 13. Thus, rolling controls are provided for the rotary plow 14 by extending and contracting the hydraulic cylinders 13.

Figure 2:
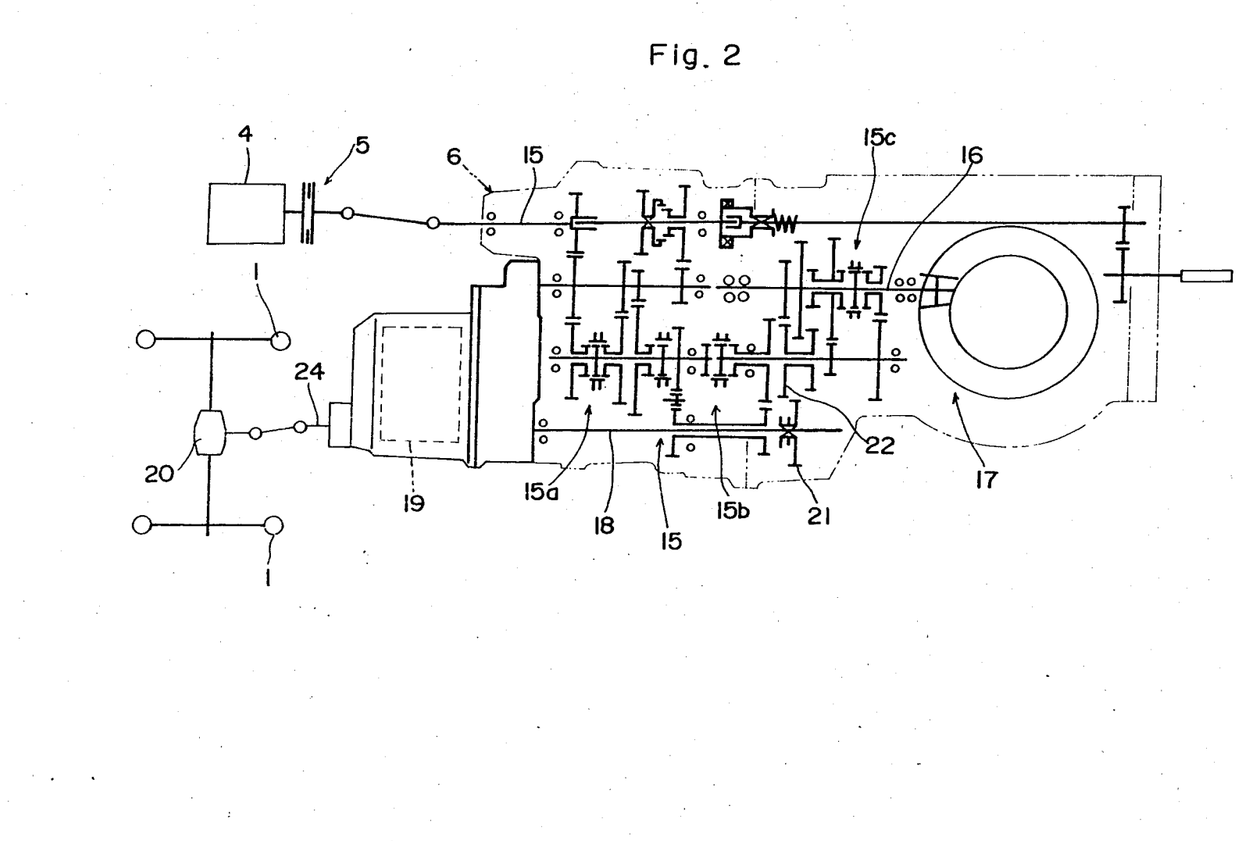
FIG. 2 is a schematic view of a transmission system of the tractor.

Referring to FIG. 2 showing a transmission system for driving the front wheels 1 and rear wheels 2, the power of the engine 4 is transmitted through the main clutch 5 to an input shaft 13 mounted in the transmission case 6. The torque of this input shaft 13 is transmitted to a propelling drive transmission 15. The output torque of the transmission 15 is transmitted to a rear differential 17 through a first output shaft 16, and to a front wheel change speed mechanism 19 through a second output shaft 19. The output torque of the front wheel change speed mechanism 19 is transmitted to a front differential 20.

The propelling drive transmission 15 comprises a main change speed section 15a operable to provide three speeds, a backward and forward drive switching section 15b, and an auxiliary change speed section 15c operable to provide two speeds. Further, the second output shaft 18 carries a clutch gear 21 slidably mounted thereon, and by moving this gear 21 into and out of engagement with a transmission gear 22 the propelling drive transmission 15 is switchable between a four wheel drive state for driving all the front wheels 1 and rear wheels 2 and a two wheel drive state for driving only the rear wheels 2.

The front wheel change speed mechanism 19 will particularly be described with reference to FIG. 3. The front wheel change speed mechanism 19 in its entirety is disposed in front of the transmission case 6. The power taken out at a position immediately upstream of the transmission line extending to the rear wheels 2, is transmitted from the second output shaft 18 to the front wheel change speed mechanism 19. The front wheel change speed mechanism 19 is housed in a change speed case 21 which supports a transmission shaft 22. In order to establish gear transmission between the transmission shaft 22 and the second output shaft 18, the second output shaft 18 defines a gear 18a on a portion thereof projecting into the change speed case 21 and the transmission shaft 22 carries an input gear 23 fixed thereto and meshed with the gear 18a. The change speed case 21 further supports a front drive output shaft 24 coaxial with the second output shaft 18 and parallel to the transmission shaft 22. The transmission shaft 22 carries a first and a second output gears 25 and 26 freely rotatably mounted thereon, and the front drive output shaft 24 carries a first and a second driven gears 27 and 28 fixed thereto and meshed with the first and second output gears 25 and 26, respectively. A pin engagement type claw clutch 29 is provided between the first output gear 25 and the transmission shaft 22, and a multidisk clutch 30 is provided between the second output gear 26 and the transmission shaft 22.

A hydraulically operable piston 31 is provided which is movable between a position to disengage the claw clutch 29 and engage the multidisk clutch 30 and a position to engage the claw clutch 29 and disengage the multidisk clutch 30. Further, a spring 32 is provided to bias the piston 31 to the position to engage the claw clutch 29 and disengage the multidisk clutch 30. An oil chamber 34' is defined between the piston 31 and a drum-like stationary member 33 fixed to the transmission shaft 22. The hydraulically operable piston 31 acts to apply a biasing force to the multidisk clutch 30. In addition, the piston also acts by utilizing the spring force to cause engaging elements 34 attached thereto and extending through the stationary member 33 to project into engagement bores 35 defined in the first output gear 25, and by utilizing a hydraulic pressure to cause the engaging element 34 to withdraw from the engagement bores 35.

Normally the hydraulic pressure is not applied and the claw clutch 29 is engaged by the biasing force of the spring 32. At this time the power of the second output shaft 18 is transmitted to the front drive output shaft 24 through the transmission shaft 22, claw clutch 29, first output gear 25 and driven gear 27, which establishes a standard drive state in which the front wheels 1 are driven at a substantially equal speed to that of the rear wheels 2. Conversely, when pressure oil is supplied to the oil chamber 34' to operate the multidisk clutch 30, the claw clutch 29 is disengaged and the multidisk clutch 30 is engaged. Then the power of the second output shaft 18 is transmitted to the front drive output shaft 24 through the transmission shaft 22, multidisk clutch 30, second output gear 26 and driven gear 28, which establishes an accelerating drive state in which the front wheels 1 are driven at a higher speed than the rear wheels 2.

Figure 3:
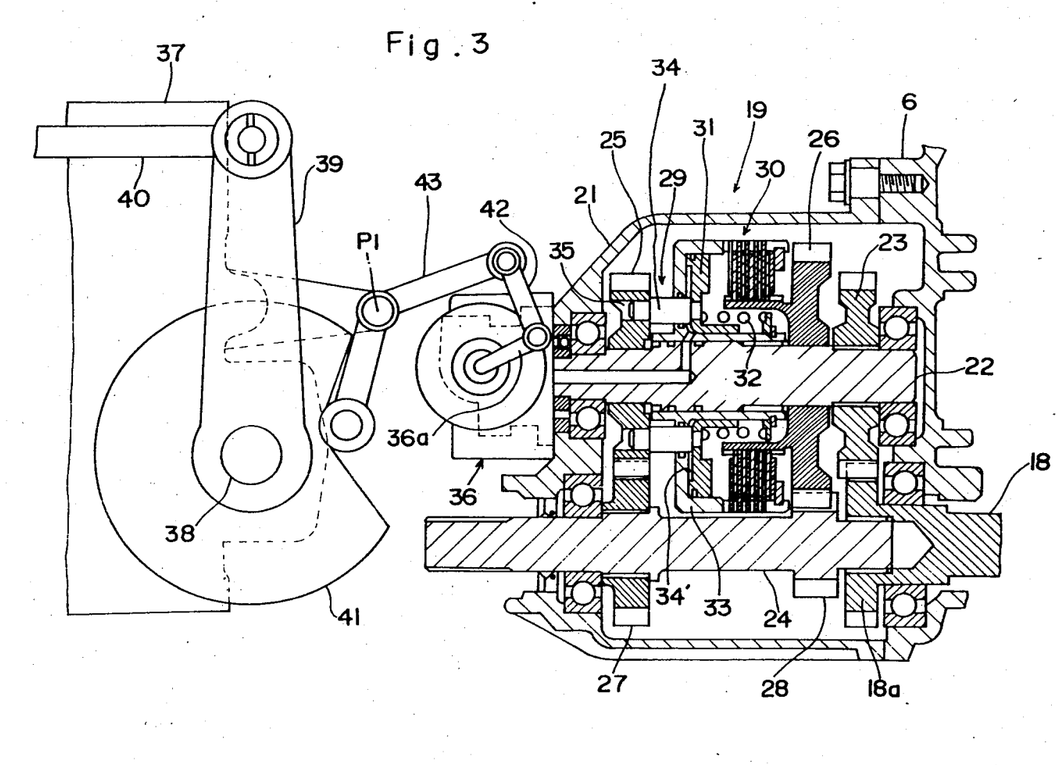
FIG. 3 is a side view, partly in section, of a front wheel drive transmission and elements adjacent a pitman arm.
Figure 4:
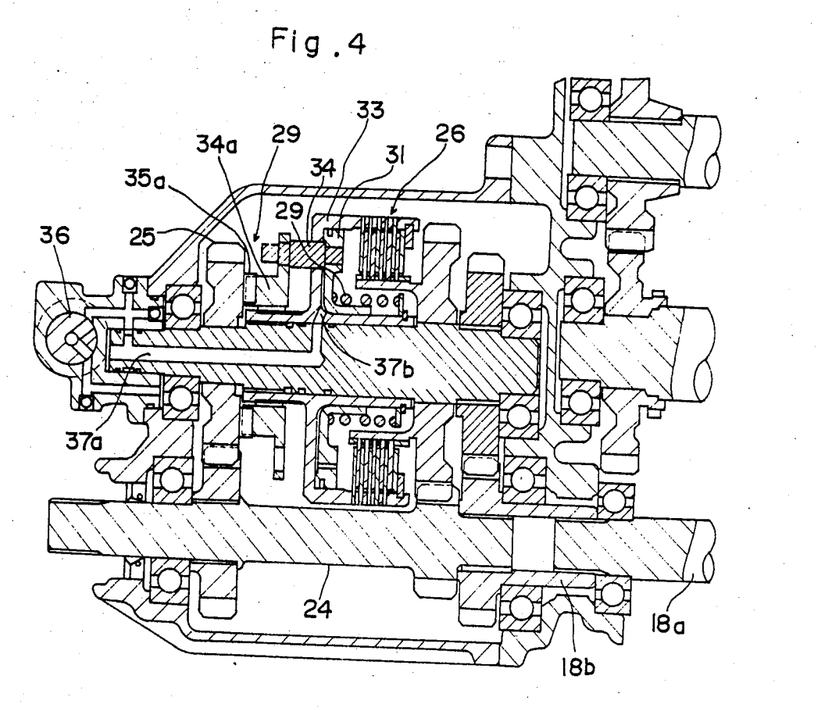
FIG. 4 is a sectional side view of a front wheel drive transm ssion according to another embodiment.

FIG. 4 shows a modified example of claw clutch 29 which is different from the example shown in FIG. 3 in that a toothed member 34a splined to the stationary member 33 is attached to the engaging elements 34 and that the first output gear 25 includes a toothed portion 35a instead of the engagement bores 35. The toothed member 34a is moved into and out engagement with the toothed portion 35a by the movements of piston 31. Furthermore, the second output shaft 18 carries a separate gear 18b instead of the gear 18a forming an integral part of the second output shaft 18, and the front drive output shaft 24 is freely rotatably fitted in a boss portion of the gear 18b.

The change speed case 21 includes a control valve 36 mounted adjacent a front end of the transmission shaft 24 to supply and exhaust the pressure oil to/from the oil chamber 34' for actuating the piston 31. As seen in FIG. 4, the control valve 36 is connected to the oil chamber 34' by a first flow passage 37a defined in the transmission shaft 22 and a second flow passage 37b defined in the stationary member 33. This control valve 36 comprises the rotary type which is switchable between two positions, namely a standard drive position to exhaust the pressure oil from the oil chamber 34' and an accelerating drive position to supply the pressure oil to the oil chamber 34', and is biased by a spring (not shown) contained therein to the exhaust or standard drive position.

Figure 5:
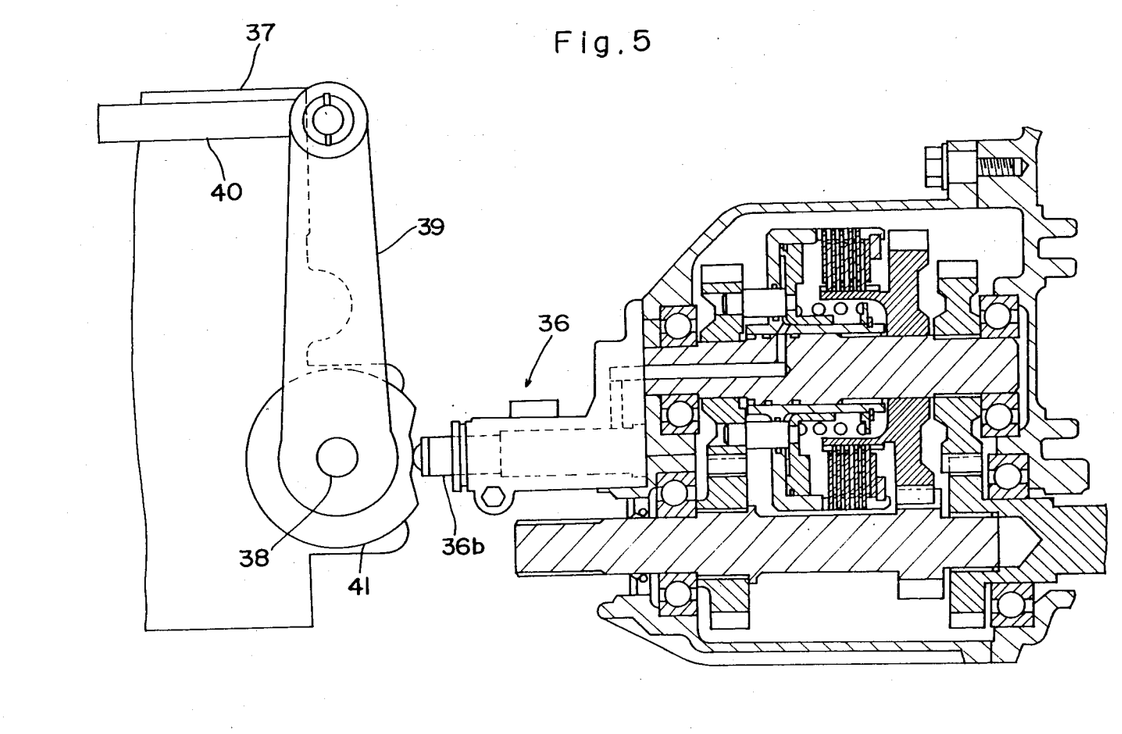
FIG. 5 is a side view, partly in section, of a front wheel drive transmission and elements adjacent a pitman arm according to a further embodiment.

The control valve 36 may comprise the spool type as shown in FIG. 5, in which case the valve 36 is biased by a spring (not shown) contained therein to the oil exhaust position, namely to a position in which a spool 36b projects forwardly.

As shown in FIG. 3, a steering gearbox 37 is disposed forwardly of the control valve 36. A pitman arm 39 is attached to a control shaft 38 extending laterally from the steering gearbox 37. The pitman arm 39 is operatively connected to the front wheels 1 through a drag link 40.

The control shaft 38 carries a disk-like cam member 41 including a partial cutout. A bell crank 43 is pivotally supported by an axis P1 extending transversely of the chassis. The bell crank 43 is operatively connected at one end thereof through an interlocking link 42 to a rotor control arm 36a of the control valve 36, and has the other end in engagement with the cutout of the cam member 41.

Accordingly, a steering operation exceeding a predetermined angle causes the rotor of the control valve 36 through the cam member 41, bell crank 43 and interlocking link 42 to rotate to the pressure oil supply position or accelerating drive position, whereby the tractor is capable of a small sharp turn.

Where the control valve 36 comprises the spool type as shown in FIG. 5, the spool 22a is placed in contact with the cam member 41. Thus, a steering operation exceeding the predetermined angle causes the cam member 41 to force the spool 36b of the control valve 36 to the pressure oil supply position or accelerating drive position, whereby the tractor is capable of a small sharp turn.

Figure 6:
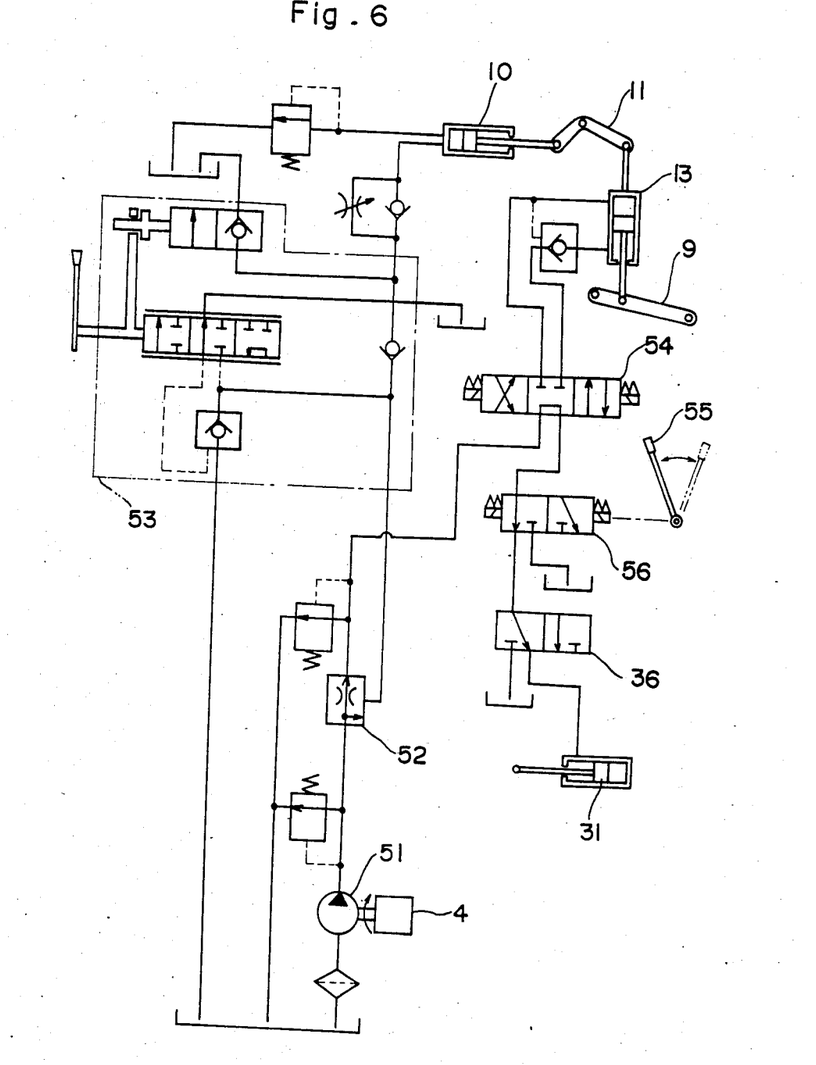
FIG. 6 is a schematic view of a hydraulic circuitry for controlling the front wheel drive transmission.

FIG. 6 shows a hydraulic circuitry for vertically moving and effecting the rolling controls for the rotary plow 14, and for switching the front wheel change speed mechanism 19 from the standard drive state to the accelerating drive state.

According to this circuitry, a pump 51 directly connected to the engine 4 supplies the pressure oil to a flow priority valve 52. The pressure oil from an overflow port of the flow priority valve 52 is supplied through a control valve 53 to the hydraulic cylinder 14. The pressure oil from a controlled flow port of the flow priority valve 52 is supplied through an electromagnetic valve 54 to the hydraulic cylinder 4. The oil from the electromagnetic valve 54 is supplied to the rotary valve 36 for actuating the hydraulically operable piston 31, through an electromagnetic valve 56 switchable to a supply position only when an auxiliary change speed lever 55 for operating the auxiliary change speed section 15c is pivoted to a low speed position. The rotary valve 36 is automatically switchable to the position to supply the pressure oil to the hydraulically operable piston 31 only when the front wheels 1 are steered to a degree exceeding the predetermined angle.

In sum, when the auxiliary change speed section 15c is in the low speed position and the front wheels 1 are steered to a degree exceeding the predetermined angle (which is 30° in the case of power steering and 43° in the case of manual steering), the electromagnetic valve 56 and the rotary valve 36 are switched to the respective positions shown in FIG. 6 to place the front wheel change speed mechanism 19 in the accelerating drive state thereby permitting the tractor to make a small turn.

Figure 7:
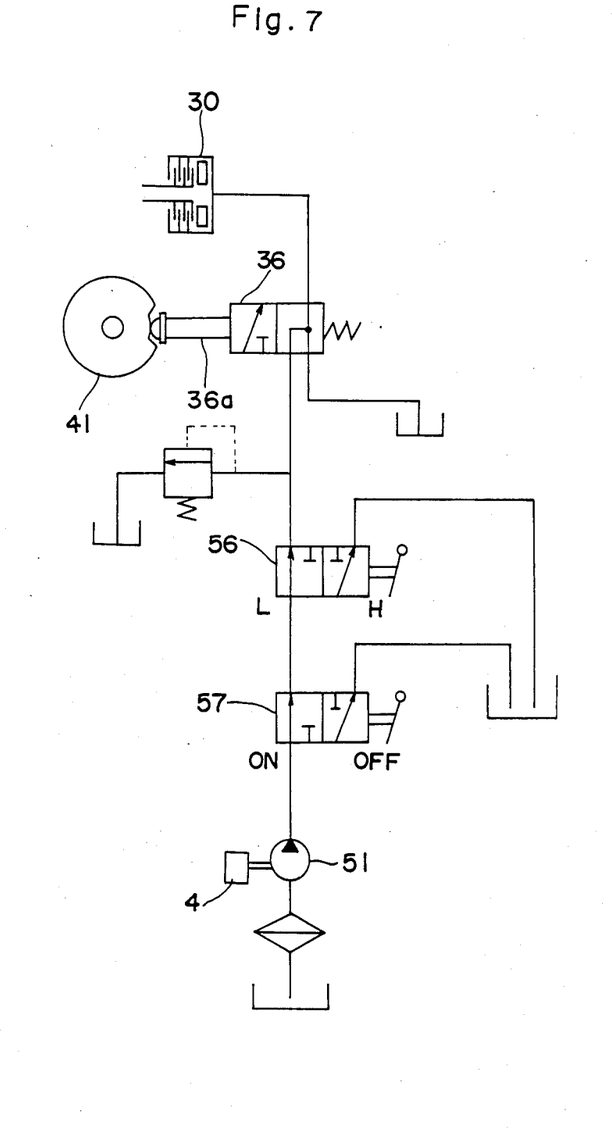
FIG. 7 is a schematic view of a modified hydraulic circuitry.

A modified oil supply system for the control valve 36 will be described next. As shown in FIG. 7, the pressure oil from the pump 51 is supplied to the control valve 36 through a first changeover valve 57 for allowing the accelerating drive state and a second changeover valve 56 operable in association with the two, high and low, speed positions of the auxiliary change speed section. Accordingly, by operating the first changeover valve 57 manual switching may be effected between a position to establish the accelerating drive state in response to a steering operation and a position not to establish the accelerating drive state. Even when the first changeover valve 57 is placed in the position to establish the accelerating drive state, the pressure oil is not supplied to the control valve 36 unless the auxiliary change speed section is placed in the low speed position L.

Figure 8:
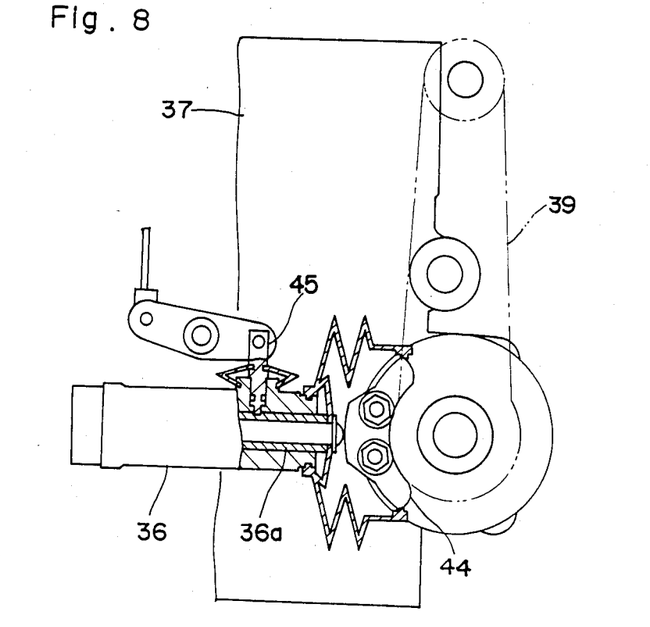
FIG. 8 is a side view, partly in section, of a front wheel drive transmission and elements adjacent a pitman arm according to a still further embodiment.

A modified interlocking structure between the control valve 36 and the pitman arm 25 will be described next. As shown in FIG. 8, the control valve 36 is mounted on the steering gearbox 37, with a spool 36a biased by a spring contained therein (not shown) to project to the pressure oil supply or accelerating drive position. A cam member 44 including a bulge portion is attached to the control shaft for operating a pitman arm 39. This construction permits the spool 36a to project to the accelerating drive position at times of steering operation exceeding the predetermined angle. The control valve 36 further includes a lock pin 45 manually projectable and withdrawable to lock the spool 36a to a retracted or oil exhaust position, thereby establishing the standard drive state regardless of the steering operation.

What is claimed is:

1. A four wheel drive vehicle comprising;
    an engine,
    a transmission case housing a main propelling drive transmission,
    front wheels and rear wheels driven by the engine, the front wheels being dirigible,
    front wheel drive transmission means connected to the main transmission for effecting changeover between a first four wheel drive mode in which the front wheels and the rear wheels are driven at a substantially equal peripheral speed and a second four wheel drive mode in which the front wheels are driven at a higher peripheral speed than the rear wheels,
    said front wheel drive transmission means including a first transmission mechanism for effecting the first four wheel drive mode, a second transmission mechanism for effecting the second four wheel drive mode, and clutching means, said clutching means having a first clutch for operatively connecting the first transmission mechanism to the front wheels, a second clutch for operatively connecting the second transmission mechanism to the front wheels, a hydraulically operable piston movable between a position to disengage the first clutch and engage the second clutch and a position to engage the first clutch and disengage the second clutch, and a spring for biasing the piston toward the position to engage the first clutch and disengage the second clutch, and
    hydraulic control means for actuating the piston and including a control valve mechanically interlocked to a steering section of the vehicle.

2. A four wheel drive vehicle as claimed in claim 1 wherein the first clutch comprises a claw clutch and the second clutch comprises a multidisk clutch.

3. A four wheel drive vehicle as claimed in claim 1 wherein the hydraulic control means further includes a switching control member for mechanically interlocking the control valve to a pitman arm for steering the front wheels, said front wheel drive transmission means being switchable to the second four wheel drive mode when the front wheels are steered to an angle exceeding a predetermined angle.

4. A four wheel drive vehicle as claimed in claim 3 wherein the front wheel drive transmission means is disposed in front of the transmission case and the control valve is disposed in front of the front wheel drive transmission means.

5. A four wheel drive vehicle as claimed in claim 4 wherein the hydraulic control means includes a valve operatively connected to a change speed lever connected to the propelling drive transmission, whereby the oil supply to the hydraulically operable piston is cut when the propelling drive transmission is in a high speed position.

6. A four wheel drive vehicle as claimed in claim 1 wherein the front wheels and the rear wheels are driven in the second four wheel drive mode in such a peripheral speed ratio that the rear wheels are dragged by the front wheels.

7. A four wheel drive vehicle as claimed in claim 6 wherein said peripheral speed ratio of the front wheels with respect to the rear wheels is 2.0 to 2.5.

* * * * *